United States Patent
Lee

(10) Patent No.: US 11,787,905 B2
(45) Date of Patent: Oct. 17, 2023

(54) POLYAMIDE COMPOUND

(71) Applicant: TOYOTA BOSHOKU KABUSHIKI KAISHA, Aichi (JP)

(72) Inventor: Chihan Lee, Aichi (JP)

(73) Assignee: TOYOTA BOSHOKU KABUSHIKI KAISHA, Aichi (JP)

(*) Notice: Subject to any disclaimer, the term of this patent is extended or adjusted under 35 U.S.C. 154(b) by 576 days.

(21) Appl. No.: 16/773,216

(22) Filed: Jan. 27, 2020

(65) Prior Publication Data

US 2020/0247952 A1 Aug. 6, 2020

(30) Foreign Application Priority Data

Jan. 31, 2019 (JP) ................................. 2019-015433

(51) Int. Cl.
  C08G 69/00 (2006.01)
  C08G 69/26 (2006.01)
  C08L 77/06 (2006.01)

(52) U.S. Cl.
  CPC ........... C08G 69/265 (2013.01); C08G 69/00 (2013.01); C08L 77/06 (2013.01)

(58) Field of Classification Search
  CPC .......... C08L 77/00; C08L 77/06; C08L 79/08; C08J 2377/06; C08G 69/00
  See application file for complete search history.

(56) References Cited

U.S. PATENT DOCUMENTS

| | | | |
|---|---|---|---|
| 4,794,159 A | 12/1988 | Teramoto et al. | |
| 10,450,415 B2 * | 10/2019 | Lee | C08G 69/265 |
| 11,220,577 B2 | 1/2022 | Lee | |
| 2018/0127544 A1 * | 5/2018 | Lee | C08G 69/265 |
| 2020/0247950 A1 | 8/2020 | Lee | |

FOREIGN PATENT DOCUMENTS

| | | |
|---|---|---|
| JP | 63-99231 | 4/1988 |
| JP | 2006-77185 | 3/2006 |
| JP | 2018-24792 | 2/2018 |
| JP | 2018-030913 A | 3/2018 |
| JP | 2020-122096 A | 8/2020 |
| WO | 2017/006748 | 1/2017 |

OTHER PUBLICATIONS

Chatti, S. et al., "Coploycarbonates of Isosorbide and Various Diols", Journal of Polymer Science: Part A: Polymer Chemistry, vol. 44, 2006, pp. 1851.
Lee, C. et al., "Improving the Mechanical Properties of Isosorbide Copolycarbonates by Varying the Ratio of Comonomers", Journal of Applied Polymer Science, vol. 127, 2013, pp. 530.
Chatti, S. et al., "Efficient synthesis of polyethers from isosorbide by microwave-assisted phase transfer catalysis", European Polymer Journal, vol. 33, 2002, pp. 3616.
Chatti, S. et al., "Coploycarbonates of Isosorbide and Various Diols," Journal of Polymer Science: Part A: Polymer Chemistry, vol. 44, 2006, pp. 3616.
Chatti, S. et al., "Efficient synthesis of polyethers from isosorbide by microwave-assisted phase transfer catalysis," European Polymer Journal, vol. 38, 2002, pp. 1851.
Japanese Office Action issued with respect to Japanese Application No. 2019-015433, dated Jun. 16, 2022.
Office Action issued in Japanese Application No. 2019-015433 dated Dec. 20, 2022, along with English translation thereof.

* cited by examiner

*Primary Examiner* — Gregory Listvoyb
(74) *Attorney, Agent, or Firm* — GREENBLUM & BERNSTEIN, P.L.C.

(57) ABSTRACT

Provided is a polyamide compound excellent in various properties such as heat resistance and impact resistance. The polyamide compound contains a dicarboxylic acid unit represented by the general formula (1) and a diamine unit having a 9,9-bisarylfluorene skeleton. This polyamide compound is excellent in heat resistance and impact resistance.

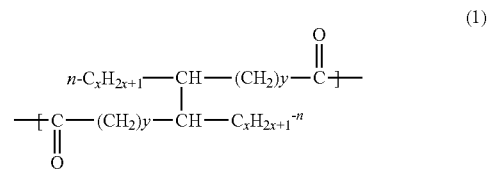

(1)

2 Claims, No Drawings

POLYAMIDE COMPOUND

CROSS-REFERENCE TO RELATED APPLICATION

This application claims the benefit of Patent Application No. 2019-15433 filed in Japan on Jan. 31, 2019, the contents of which are incorporated herein by reference.

BACKGROUND OF THE INVENTION

The present disclosure relates to a polyamide compound.

From the viewpoint of preventing global warming and reducing resource risks, polymers using plant-derived compounds as starting materials are attracting attention, instead of petroleum polymers (see, for example, Non-Patent Literatures 1 to 3).

However, polylactic acid as a typical example of such polymers is a plant-derived compound, but has problems in heat resistance and hydrolysis resistance. Therefore, the application range is limited only with polylactic acid.

Under such circumstances, the development of plant-derived high-performance polymers other than polylactic acid is desired.

Conventionally known polyamide compounds include PA6 obtained by polymerization of ε-caprolactam as well as PA66, PA610, and PA1010 obtained by polymerization of a dicarboxylic acid and a diamine. PA11 which is a plant-derived polyamide compound, is obtained by polymerization of 11-aminoundecanoic acid.

However, conventional polyamide compounds obtained by polymerization of ε-caprolactam, dicarboxylic acid and diamine, and 11-aminoundecanoic acid may not have sufficient properties.

CITATION LIST

Non-Patent Literature

Non-Patent Literature 1: S. Chatti, M. Bortolussi, A. Loupy, J. C. Blais, D. Bogdal, M. Majdoub. Eur. Polym. J. 38, 1851 (2002).

Non-Patent Literature 2: S. Chatti, H. R. Kricheldorf. G. Schwarz. J. Polym. Sci. Part A: Polym. Chem. 44, 3616 (2006).

Non-Patent Literature 3: C.-H. Lee, H. Takagi, H. Okamoto, M. Kato. J. Appl. Polym. Sci. 127, 530 (2013).

BRIEF SUMMARY OF THE INVENTION

The present invention has been made in view of the above situations, and an object thereof is to provide a polyamide compound excellent in various properties, such as heat resistance and impact resistance.

In view of the above-described conventional techniques, the present inventors have developed a novel polyamide compound as a result of intensive studies.

The present inventors have found an unexpected fact that this novel polyamide compound has excellent properties which are not seen in conventional polyamide compounds. The present invention has been made based on this finding.

Specifically, a first aspect of the present invention is a polyamide compound containing:

a dicarboxylic acid unit represented by the following general formula (1); and a diamine unit represented by the following general formula (2):

[Chemical Formula 1]

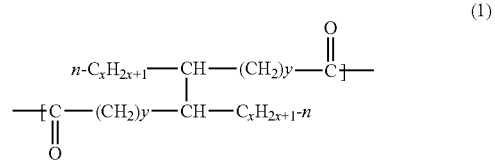

(1)

wherein x represents an integer from 6 to 12, and y represents an integer from 8 to 18;

[Chemical Formula 2]

(2)

[Chemical Formula 3]

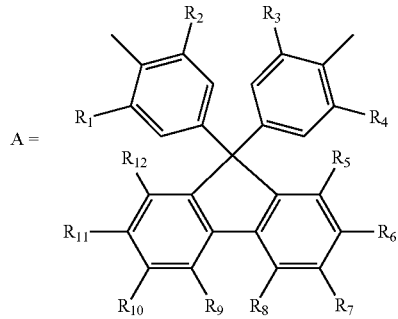

wherein $R_1$ to $R_{12}$ represent —H, an alkyl group represented by —$C_nH_{2n+1}$ (n=an integer of 1 to 4), an alkoxyl group represented by —$OC_nH_{2n+1}$ (n=an integer of 1 to 4), a carboxyl group, a carboxymethyl group, or halogen, which may be the same or different.

The polyamide compound of the present invention is excellent in properties such as heat resistance and impact resistance.

DETAILED DESCRIPTION

The particulars shown herein are by way of example and for purposes of illustrative discussion of the embodiments of the present invention only, and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

A second aspect of the present invention is the polyamide compound further containing a dicarboxylic acid unit represented by the following general formula (3):

[Chemical Formula 4]

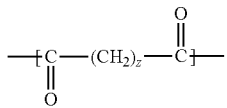

(3)

wherein z represents an integer of 2 to 18.

A third aspect of the present invention is the polyamide compound further containing a dicarboxylic acid unit represented by the following general formula (4):

[Chemical Formula 5]

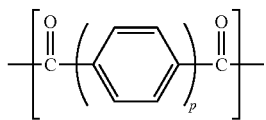

(4)

wherein p represents an integer of 1 to 5.

Hereinafter, the present disclosure will be described in detail.

[1] Polyamide Compound

The polyamide compound of the present disclosure contains a dicarboxylic acid unit represented by the following general formula (1) and a diamine unit represented by the following general formula (2).

[Chemical Formula 6]

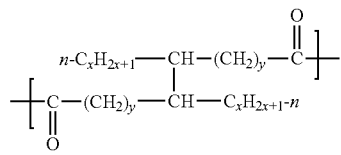

(1)

wherein x represents an integer from 6 to 12, and y represents an integer from 8 to 18;

x is preferably an integer of 8 to 10; and y is preferably an integer of 9 to 13.

[Chemical Formula 7]

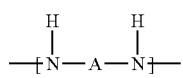

(2)

[Chemical Formula 8]

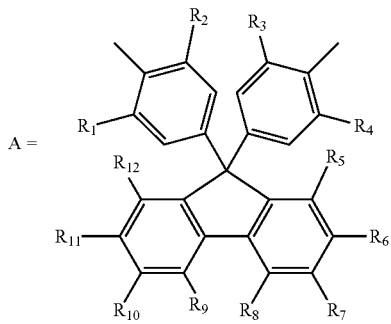

wherein $R_1$ to $R_{12}$ represent —H, an alkyl group represented by —$C_nH_{2n+1}$ (n=an integer of 1 to 4), an alkoxyl group represented by —$OC_nH_{2n+1}$ (n=an integer of 1 to 4), a carboxyl group, a carboxymethyl group, or halogen, which may be the same or different.

The polyamide compound of the present disclosure may further contain a structural unit other than those described above, as long as the effects of the present invention are not impaired.

In the polyamide compound of the present disclosure, the content of the dicarboxylic acid unit is not particularly limited. The content of the dicarboxylic acid unit is usually 5 to 50 mol %, preferably 20 to 50 mol %, more preferably 30 to 50 mol %.

In the polyamide compound of the present disclosure, the content of the diamine unit is not particularly limited. The content of the diamine unit is usually 5 to 50 mol %, preferably 20 to 50 mol %, more preferably 30 to 50 mol %.

The proportions of the contents of the dicarboxylic acid unit and the diamine unit are preferably substantially the same from the viewpoint of the polymerization reaction, and the content of the dicarboxylic acid unit is more preferably +1 mol % of the content of the diamine unit.

[1-1] Dicarboxylic Acid Unit

The polyamide compound of the present disclosure contains a dicarboxylic acid unit represented by the following general formula (1) as described above.

[Chemical Formula 9]

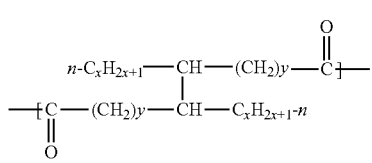

(1)

wherein x represents an integer from 6 to 12, and y represents an integer from 8 to 18;

As the dicarboxylic acid unit, a unit represented by the following formula is particularly preferred. The unit represented by the following formula is derived from a plant, which is preferable from the viewpoint of preventing global warming and reducing resource risk.

[Chemical Formula 10]

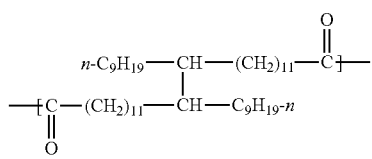

When the total of the dicarboxylic acid units in the polyamide compound of the present disclosure is 100 mol %, the content of the dicarboxylic acid unit represented by the general formula (1) is not particularly limited. The dicarboxylic acid unit represented by the general formula (1) is preferably contained in an amount of 30 to 100 mol %, more preferably 50 to 100 mol %, particularly preferably 70 to 100 mol %. When the content of the dicarboxylic acid unit represented by the general formula (1) is within this range, excellent heat resistance and impact resistance are obtained.

The dicarboxylic acid unit in the polyamide compound of the present disclosure may include a dicarboxylic acid unit represented by the general formula (3) in addition to the dicarboxylic acid unit represented by the general formula (1):

[Chemical Formula 11]

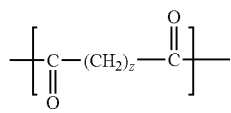 (3)

In the general formula (3), z is an integer of 2 to 18, preferably an integer of 2 to 8, more preferably an integer of 2 to 5.

As the dicarboxylic acid unit represented by the general formula (3), a unit represented by the following formula is particularly preferable. When the polyamide compound has a unit represented by the following formula, especially the bending properties are improved.

[Chemical Formula 12]

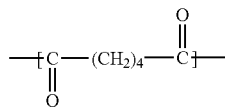

Further, the dicarboxylic acid unit in the polyamide compound of the present disclosure may include a dicarboxylic acid unit represented by the general formula (4) in addition to the dicarboxylic acid unit represented by the general formula (1):

[Chemical Formula 13]

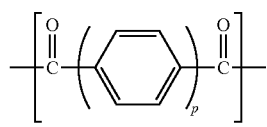 (4)

In the general formula (4), p is an integer of 1 to 5.

As the dicarboxylic acid unit represented by the general formula (4), a unit represented by the following formula is particularly preferable. When the polyamide compound has a unit represented by the following formula, especially the bending properties are improved.

[Chemical Formula 14]

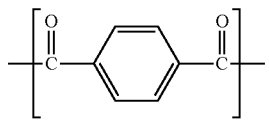

In the case where the dicarboxylic acid unit represented by the general formula (3) is contained in addition to the dicarboxylic acid unit represented by the general formula (1), the total of the dicarboxylic acid unit represented by the general formula (1) and the dicarboxylic acid unit represented by the general formula (3) is preferably 50 to 100 mol %, more preferably 60 to 100 mol %, particularly preferably 70 to 100 mol %, when the total of the dicarboxylic acid units in the polyamide compound is 100 mol %.

In the case where the dicarboxylic acid unit represented by the general formula (4) is contained in addition to the dicarboxylic acid unit represented by the general formula (1), the total of the dicarboxylic acid unit represented by the general formula (1) and the dicarboxylic acid unit represented by the general formula (4) is preferably 50 to 100 mol %, more preferably 60 to 100 mol %, particularly preferably 70 to 100 mol %, when the total of the dicarboxylic acid units in the polyamide compound is 100 mol %.

When the polyamide compound contains the dicarboxylic acid unit represented by the general formula (3) in addition to the dicarboxylic acid unit represented by the general formula (1), the molar ratio of the dicarboxylic acid unit represented by the general formula (1): the dicarboxylic acid unit represented by the general formula (3) is preferably 99:1 to 1:99, more preferably 90:10 to 10:90, particularly preferably 60:40 to 40:60.

When the polyamide compound contains the dicarboxylic acid unit represented by the general formula (4) in addition to the dicarboxylic acid unit represented by the general formula (1), the molar ratio of the dicarboxylic acid unit represented by the general formula (1): the dicarboxylic acid unit represented by the general formula (4) is preferably 99:1 to 1:99, more preferably 90:10 to 10:90, particularly preferably 60:40 to 40:60.

In addition to the dicarboxylic acid unit represented by the general formula (1), the polyamide compound may contain both the dicarboxylic acid unit represented by the general formula (3) and the dicarboxylic acid unit represented by the general formula (4).

When the polyamide compound contains the dicarboxylic acid unit represented by the general formula (1), the dicarboxylic acid unit represented by the general formula (3), and the dicarboxylic acid unit represented by the general formula (4), the molar ratio of the dicarboxylic acid unit represented by the general formula (1): the total units of the dicarboxylic acid unit represented by the general formula (3) and the dicarboxylic acid unit represented by the general formula (4) is preferably 99:1 to 1:99, more preferably 90:10 to 10:90, particularly preferably 60:40 to 40:60.

The repeating unit that may be contained in the polyamide compound includes the following combinations of a dicarboxylic acid unit and a diamine unit.

(A) A combination of the dicarboxylic acid unit represented by the general formula (1) and the diamine unit represented by the general formula (2).

(B) A combination of the dicarboxylic acid unit represented by the general formula (3) and the diamine unit represented by the general formula (2).

(C) A combination of the dicarboxylic acid unit represented by the general formula (4) and the diamine unit represented by the general formula (2).

Different types of repeating units may be present in the polyamide compound randomly. Further, the same type of repeating units may be present in the polyamide compound in a form of blocks.

The compound that can constitute a dicarboxylic acid unit other than the dicarboxylic acid units represented by the general formulas (1), (3), and (4) is not particularly limited.

Specific examples of dicarboxylic acid compounds include, for example, linear aliphatic dicarboxylic acids with 2 to 25 carbon atoms such as oxalic acid, malonic acid, fumaric acid, and maleic acid; or aliphatic dicarboxylic acids such as dimerized aliphatic dicarboxylic acids (dimer acids) with 14 to 48 carbon atoms obtained by dimerization of unsaturated fatty acids obtained by fractional distillation of triglycerides and hydrogenated products (hydrogenated dimer acids) thereof; alicyclic dicarboxylic acids such as 1,4-cyclohexanedicarboxylic acid; and aromatic dicarboxylic acids such as isophthalic acid, 1,3-benzenediacetic acid, and 1,4-benzenediacetic acid. In addition, derivatives of these dicarboxylic acid compounds may be used. Examples of the derivatives include carboxylic acid halides. These can be used alone, or two or more thereof can be used in combination.

When the total of the dicarboxylic acid units in the polyamide compound of the present disclosure is 100 mol %, the content of dicarboxylic acid units other than the dicarboxylic acids represented by the general formulas (1), (3) and (4) is not particularly limited. The content of dicarboxylic acid units other than the dicarboxylic acids represented by the general formulas (1), (3), and (4) is preferably less than 50 mol %, more preferably less than 20 mol %, particularly preferably less than 10 mol %. When the content of a dicarboxylic acid unit other than the dicarboxylic units represented by the general formulas (1), (3), and (4) is within this range, excellent heat resistance and impact resistance are obtained.

[1-2] Diamine Unit

The diamine unit in the polyamide compound of the present disclosure includes a diamine unit represented by the general formula (2):

[Chemical Formula 15]

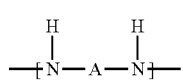

(2)

[Chemical Formula 16]

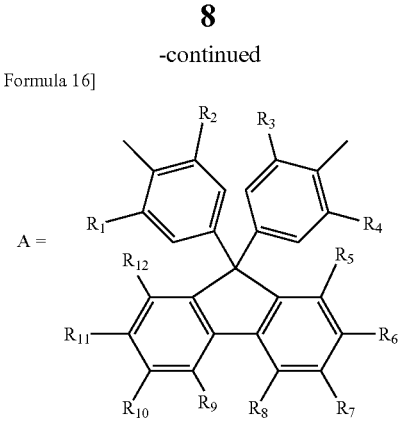

wherein $R_1$ to $R_{12}$ represent —H, an alkyl group represented by —$C_nH_{2n+1}$ (n=an integer of 1 to 4), an alkoxyl group represented by —$OC_nH_{2n+1}$ (n=an integer of 1 to 4), a carboxyl group, a carboxymethyl group, or halogen, which may be the same or different.

The diamine unit has a fluorene skeleton such as a 9,9-bisarylfluorene skeleton. Examples of the compound that can constitute the diamine unit include bisaniline fluorenes. Specific examples of such bisaniline fluorenes include 9,9-bis(4-aminophenyl)fluorene, 9,9-bis(3-methyl-4-aminophenyl)fluorene, 9,9-bis(3,5-dimethyl-4-aminophenyl)fluorene, 9,9-bis(3-ethyl-4-aminophenyl)fluorene, 9,9-bis(3,5-diethyl-4-aminophenyl)fluorene, 9,9-bis(3-bromo-4-aminophenyl)fluorene, 9,9-bis(3,5-dibromo-4-aminophenyl)fluorene, 9,9-bis(4-aminophenyl)fluorene-4-carboxylic acid, and methyl 9,9-bis(4-aminophenyl)fluorene-4-carboxylate. These can be used alone, or two or more thereof can be used in combination.

As the diamine unit, a unit represented by the following formula is particularly preferable.

[Chemical Formula 17]

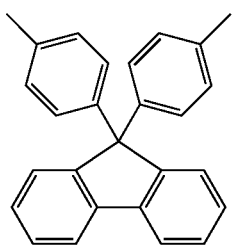

When the total of the diamine units in the polyamide compound of the present disclosure is 100 mol %, the diamine unit represented by the general formula (2) is preferably contained in an amount of 5 to 100 mol %, more preferably 20 to 100 mol %, particularly preferably 30 to 100 mol %. When the content of the diamine unit represented by the general formula (2) is within this range, excellent heat resistance and impact resistance are obtained.

The compound that can constitute a diamine unit other than the diamine unit represented by the general formula (2) is not particularly limited.

Examples of diamines other than the diamine unit represented by the general formula (2) can include known aliphatic diamines, alicyclic diamines, aromatic diamines, and diaminoorganosiloxanes.

Examples of the aliphatic diamine that can constitute a diamine unit other than the diamine unit represented by the general formula (2) can include 1,1-metaxylylenediamine, 1,3-propanediamine, and pentamethylenediamine.

Examples of the alicyclic diamine can include 4,4'-methylenebis(cyclohexylamine) and 1,3-bis(aminomethyl)cyclohexane.

Examples of the aromatic diamines can include o-phenylenediamine, m-phenylenediamine, 4,4'-diaminodiphenylmethane, 1,5-diaminonaphthalene, 2,2'-dimethyl-4,4'-diaminobiphenyl, 4,4'-diamino-2,2'-bis(trifluoromethyl)biphenyl, 2,7-diaminofluorene, 4,4'-diamino-2,2'-dimethylbiphenyl, 2,2-bis[4-(4-aminophenoxy)phenyl]hexafluoropropane, 2,2-bis(4-aminophenyl)hexafluoropropane, 4,4'-(p-phenylenediisopropylidene)bisaniline, 4,4'-(m-phenylenediisopropylidene)bisaniline, 1,4-bis(4-aminophenoxy)benzene, 4,4'-bis(4-aminophenoxy)biphenyl, 2,6-diaminopyridine, 3,4-diaminopyridine, 2,4-diaminopyrimidine, 3,6-diaminoacridine, 3,6-diaminocarbazole, N-methyl-3,6-diaminocarbazole, N-ethyl-3,6-diaminocarbazole, N-phenyl-3,6-diaminocarbazole, N,N'-bis(4-aminophenyl)-benzidine, N,N'-bis(4-aminophenyl)-N,N'-dimethylbenzidine, 1,4-bis-(4-aminophenyl)-piperazine, 3,5-diaminobenzoic acid, dodecanoxy-2,4-diaminobenzene, tetradecanoxy-2,4-diaminobenzene, pentadecanoxy-2,4-diaminobenzene, hexadecanoxy-2,4-diaminobenzene, octadecanoxy-2,4-diaminobenzene, dodecanoxy-2,5-diaminobenzene, tetradecanoxy-2,5-diaminobenzene, pentadecanoxy-2,5-diaminobenzene, hexadecanoxy-2,5-diaminobenzene, octadecanoxy-2,5-diaminobenzene, cholestanyloxy-3,5-diaminobenene, cholestenyloxy-3,5-diaminobenzene, cholestanyloxy-2,4-diaminobenzene, cholestenyloxy-2,4-diaminobenzene, cholestanyl 3,5-diaminobenzoate, cholestenyl 3,5-diaminobenzoate, lanostanyl 3,5-diaminobenzoate, 3,6-bis(4-aminobenzoyloxy)cholestane, 3,6-bis(4-aminophenoxy)cholestane, 4-(4'-trifluoromethoxybenzoyloxy)cyclohexyl-3,5-diaminobenzoate, 4-(4'-trifluoromethylbenzoyloxy)cyclohexyl-3,5-diaminobenzoate, 1,1-bis(4-((aminophenyl)methyl)phenyl)-4-butylcyclohexane, 1,1-bis(4-((aminophenyl)methyl)phenyl)-4-heptylcyclohexane, 1,1-bis(4-((aminophenoxy)methyl)phenyl)-4-heptylcyclohexane, 1,1-bis(4-((aminophenyl)methyl)phenyl)-4-(4-heptylcyclohexyl)cyclohexane, 2,4-diamino-N,N-diallylaniline, 4-aminobenzylamine, 3-aminobenzylamine, 1-(2,4-diaminophenyl)piperazine-4-carboxylic acid, 4-(morpholin-4-yl)benzene-1,3-diamine, 1,3-bis(N-(4-aminophenyl)piperidinyl)propane, and α-amino-ω-aminophenylalkylene.

These can be used alone, or two or more thereof can be used in combination.

When the total of diamine units in the polyamide compound of the present disclosure is 100 mol %, the content of diamine units other than the diamine represented by the general formula (2) is not particularly limited. The content of diamine units other than the diamine represented by the general formula (2) is preferably less than 50 mol %, more preferably less than 30 mol %, particularly preferably less than 10 mol %. This is because when the content of the diamine unit other than the diamine unit represented by the general formula (2) is within this range, excellent heat resistance and the impact resistance are obtained.

[1-3] Molecular Weight of Polyamide Compound

The molecular weight of the polyamide compound of the present disclosure is not particularly limited. In general, the number average molecular weight (Mn) is preferably 10,000 to 50,000, more preferably 15,000 to 40,000, particularly preferably 18,000 to 38,000. Similarly, the weight average molecular weight (Mw) is preferably 20,000 to 100,000, more preferably 30,000 to 80,000, particularly preferably 35,000 to 75,000. The molecular weight here means a value in terms of polystyrene.

[1-4] Properties of Polyamide Compound

A characteristic of the polyamide compound of the present disclosure is high impact resistance. Further, a characteristic of the polyamide compound of the present disclosure is a high thermal decomposition temperature. Especially, a characteristic of the polyamide compound of the present disclosure is a high 5% weight loss temperature. Furthermore, a characteristic of the polyamide compound of the present disclosure is a non-crystalline resin.

These characteristics are not found in conventional polyamides obtained by polymerization of ε-caprolactam, dicarboxylic acid and diamine, and 11-aminoundecane.

The polyamide compound of the present disclosure uses a compound having a long chain (dicarboxylic acid component capable of constituting a dicarboxylic acid unit). Therefore, the polyamide compound is excellent in water absorption resistance since the content of hydrogen bonds in the molecule is reduced.

When the diamine unit has an aromatic ring, the moiety having the aromatic ring functions as a hard segment imparting hardness.

The —$(CH_2)_y$— moiety in the dicarboxylic acid unit functions as a soft segment that gives softness. Therefore, the polyamide compound has a structure in which the soft segment and the hard segment are linked by an amide bond. Therefore, this polyamide compound is a resin that has a hydrophobic structure, is excellent in elongation properties due to the soft alkyl chain of the soft segment, and, besides, has a rigid site due to the aromatic ring of the hard segment.

[2] Method for Manufacturing Polyamide Compound

The method for manufacturing the polyamide compound of the present disclosure is not particularly limited. Examples of the manufacturing method can include a method of reacting a dicarboxylic acid compound having a structure represented by the following general formula and a diamine compound.

Here, as the dicarboxylic acid compound, a dicarboxylic acid and, additionally, a carboxylic acid derivative in which the hydroxyl group of the carboxyl group of the dicarboxylic acid is substituted with another hetero atom (atom other than carbon, hydrogen and metal) can be used. Examples of the carboxylic acid derivative include acyl halides (acid halides) in which the hydroxyl group is replaced with halogen.

The polyamide compound of the present disclosure can be manufactured by polycondensation of a diamine component that can constitute the diamine unit and a dicarboxylic component that can constitute the dicarboxylic acid unit. The degree of polymerization can be controlled by adjusting polycondensation conditions and the like.

As a method for manufacturing a polyamide compound, for example, specifically, (1) a method using an acid or base catalyst, (2) an activation method of a carboxylic acid, (3) a method using transesterification, (4) a method using a condensing agent, or the like is suitably used. Here, as a suitable manufacturing method, a method for manufacturing a polyamide compound using an acid chloride in which a carboxylic acid is activated is exemplified.

For example, a polyamide compound can be manufactured along the following manufacture scheme. In this method, a dicarboxylic acid is activated to form an acid chloride, and the acid chloride and a diamine are reacted to form a polyamide compound. Since the polyamide compound of the present disclosure may use the raw material derived from a plant, it may be called a biopolymer or a biopolyamide in this specification.

[Chemical Formula 18]

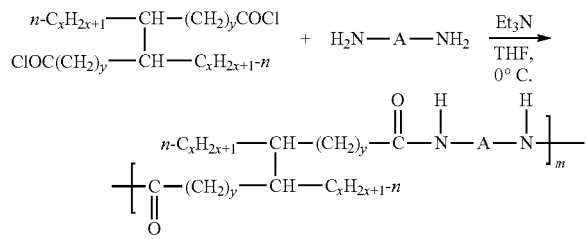

[Chemical Formula 19]

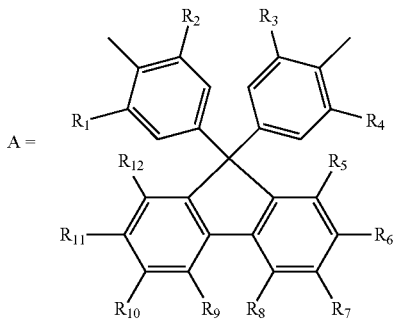

wherein $R_1$ to $R_{12}$ represent —H, an alkyl group represented by —$C_nH_{2n+1}$ (n=an integer of 1 to 4), an alkoxy group represented by —$OC_nH_{2n+1}$ (n=an integer of 1 to 4), a carboxyl group, a carboxymethyl group, or halogen, which may be the same or different.

When the dicarboxylic acid is activated to form an acid chloride, which is then reacted with a diamine, a polyamide compound can be efficiently manufactured.

Moreover, a monoamine or a monocarboxylic acid may be added as a molecular weight modifier at the time of polycondensation. Further, in order to suppress the polycondensation reaction to attain a desired degree of polymerization, the ratio (molar ratio) between the diamine component and the carboxylic acid component constituting the polyamide compound may be adjusted by shifting from 1.

When polymerization is carried out by a dehydrohalogenation reaction through a reaction of a carboxylic acid dihalide such as the above-mentioned acid chloride with a diamine, the reaction proceeds rapidly. Therefore, the reaction is preferably carried out at a relatively low temperature for reaction rate control.

For example, it is preferably carried out in the range of −10° C. to 100° C.

The reaction solvent is not particularly limited, and a known solvent can be applied widely. For example, as an organic polar solvent as the reaction solvent, tetrahydrofuran, dimethylacetamide, N-methylpyrrolidone, dimethylsulfone, dimethylformamide, N-methylcaprolactam, tetramethylurea, N,N'-dimethyl-2-imidazolidinone, or the like can be exemplified. These may be used singly or as a mixed solvent of two or more thereof. Moreover, hydrogen chloride and a metal halide salt, for example, lithium chloride, calcium chloride, potassium chloride, and the like may be used in combination, as needed, to improve the solubility.

The polyamide compound concentration (polymer concentration) is not particularly limited, although it varies depending on the solubility of the produced polyamide compound in the solvent and the solution viscosity. The concentration of the polyamide compound is preferably 0.1 to 40 mass % from the viewpoint of productivity, for example.

The concentration of the polyamide compound is determined by comprehensively judging the compositional contents and composition ratio of the polyamide compound, the solubility, the solution viscosity, the handleability, and the ease of defoaming.

The method of adding the raw materials is not particularly limited. For example, after adding diamine to the reaction solvent and dissolving it at a low temperature, a dicarboxylic acid halide such as acid chloride as one raw material is added. In this case, in order to prevent deterioration of the diamine, it is preferable to add the halide under an inert atmosphere (for example, under nitrogen atmosphere or argon gas atmosphere). The molar ratio between the diamine and acid the halide should basically be equimolar, but the diamine or acid component as one raw material may be added excessively to control the degree of polymerization, or an appropriate amount of a monofunctional organic substance such as aniline, naphthylamine, acetic acid chloride or benzoyl chloride may be added.

In addition, in the case of the polyamide compound of the present disclosure, in order to improve the properties, an addition method intended to block the polymer may be adopted such that a part of the diamine or acid halide is reacted and then the remaining raw materials are added.

The polymerization reaction product (polyamide compound) thus obtained is accompanied by hydrogen halide, which is a byproduct, and therefore needs to be neutralized. The neutralizing agent is not particularly limited as long as it is a generally known basic compound.

As the neutralizing agent, triethylamine, tripropylamine, benzyldimethylamine, lithium hydroxide, sodium hydroxide, potassium hydroxide, magnesium hydroxide, calcium hydroxide, magnesium oxide, calcium oxide, tetraethylammonium salt, etc. can be preferably used. Further, such a neutralizing agent may be added as a powder alone, but it is preferable from the viewpoint of reactivity and operability to use a finely divided powder dispersed in an organic solvent as a slurry.

The polyamide compound solution obtained by the above method can be separated in a poor solvent such as water or methanol. The solution after the neutralization reaction can also be used as a molding solution as it is.

Moreover, an industrial polycondensation method for the polyamide compound of the present disclosure is not particularly limited, and a well-known method is used widely. Examples of the method include a pressurized salt method, a normal pressure dropping method, a pressure dropping method, and a reactive extrusion method. Further, when the reaction temperature is as low as possible, yellowing and gelation of the polyamide compound can be suppressed, so that a polyamide compound having stable properties can be obtained.

The pressurized salt method is a method of performing melt polycondensation under pressure using a nylon salt as a raw material. Specifically, after preparing an aqueous nylon salt solution containing a diamine component, a dicarboxylic acid component, and, if necessary, other components, the aqueous solution is concentrated, then heated under pressure, and polycondensation is performed while condensed water is removed. While the inside of the can is gradually returned to normal pressure, the temperature is raised to about the melting point of the polyamide compound+about 10° C. and held. Then, while the pressure is further gradually reduced to 0.02 MPaG, the temperature is kept at the same temperature to continue polycondensation. When a certain stirring torque is reached, the inside of the can is pressurized to about 0.3 MPaG with nitrogen to recover the polyamide compound.

In the normal pressure dropping method, a diamine component is continuously dropped into a mixture obtained by heating and melting a dicarboxylic acid component and, if necessary, other components under normal pressure, and polycondensation is performed while condensed water is removed. The polycondensation reaction is performed while the temperature of the reaction system is raised so that the reaction temperature does not fall below the melting point of the polyamide compound to be produced.

In the pressure dropping method, first, a dicarboxylic acid component and, if necessary, other components are charged into a polycondensation can, and the components are stirred to be melt mixed, thereby preparing a mixture. Next, the diamine component is continuously added dropwise to the mixture while the inside of the can is preferably pressurized to about 0.3 to 0.4 MPaG, and polycondensation is performed while condensed water is removed. At this time, the polycondensation reaction is performed while the temperature of the reaction system is raised so that the reaction temperature does not fall below the melting point of the polyamide compound to be produced. When the set molar ratio is reached, the addition of the diamine component is terminated. While the inside of the can is gradually returned to normal pressure, the temperature is raised to about the melting point of the polyamide compound+about 10° C. and held. Then, while the pressure is further gradually reduced to 0.02 MPaG, the temperature is kept at the same temperature to continue polycondensation. When a certain stirring torque is reached, the inside of the can is pressurized to about 0.3 MPaG with nitrogen to recover the polyamide compound.

The reactive extrusion method is a method of incorporation into a polyamide skeleton by an amide exchange reaction.

[3] Polyamide Composition Using Polyamide Compound

Additives such as lubricants, crystallization nucleating agents, anti-whitening agents, matting agents, heat stabilizers, weathering stabilizers, ultraviolet absorbers, plasticizers, flame retardants, antistatic agents, coloring inhibitors, antioxidants, and impact resistance improvers may be added to the polyamide compound of the present disclosure depending on the application and performance to form polyamide compositions. These additives can be added as necessary as long as the effects of the present invention are not impaired. In addition, the polyamide compound of the present disclosure may be mixed with various resins according to required application and performance to form polyamide compositions.

[4] Application of Polyamide Compound

The polyamide compound of the present disclosure can be used for a wide variety of applications as well as the applications to which conventional polyamide compounds have been applied.

EXAMPLES

Hereinafter, the present disclosure will be described more specifically by way of Examples.
1. Synthesis of Polyamide Compound <Example 1> (Synthesis of PA/BF)

A polyamide compound PA/BF was synthesized according to the following scheme.

Scheme 1. Structure of high heat resistance bio-polyamide.

[Chemical Formula 20]

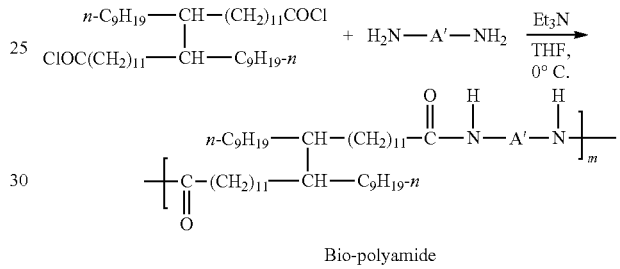

Bio-polyamide

[Chemical Formula 21]

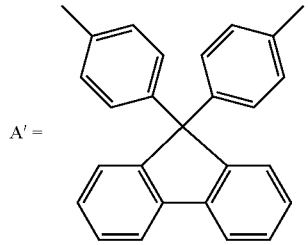

Specifically, 9,9-bis(4-aminophenyl)fluorene (BF) (34.9 g, 100.0 mmol) and THF (300 mL) were put in a separable flask (Separable flask (1000 mL)) in a nitrogen atmosphere. After stirring with a mechanical stirrer at 0° C. for 10 minutes, triethylamine (30.8 mL, 220.0 mmol) was added, and then the mixture was stirred at 0° C. for 10 minutes. Thereafter, an acid chloride (57.2 g, 80.0 mmol) was dissolved in THF (100 mL) and added dropwise, followed by reaction at 0° C. for 3 hours. After completion of the reaction, the product was reprecipitated and purified using water, and washed with water and methanol. The product was vacuum dried (80° C., 16 hours). White fibrous, yield: 95.0 g. FT-IR (ATR, cm$^{-1}$): 3294.8 (NH, amide), 2920.7, 2851.2, 1659.4 (C=O, carbonyl), 1598.7, 1529.3, 1511.9, 1448.3, 1403.9, 1312.3, 1251.6, 1185.0, 820.6, 744.4, 632.5.

<Example 2> (Synthesis of PA$_{80}$AC$_{20}$BF)

A polyamide compound PA$_{80}$AC$_{20}$BF was synthesized according to the following scheme.

Scheme 2. Structure of high heat resistance bio-polyamide.

[Chemical Formula 22]

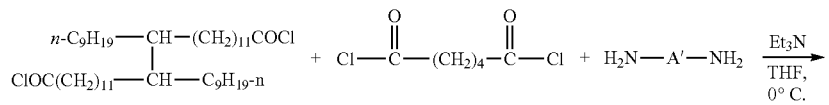

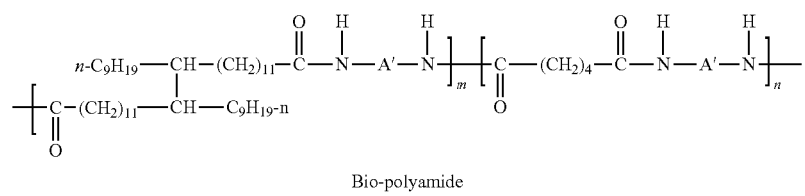

Bio-polyamide

[Chemical Formula 23]

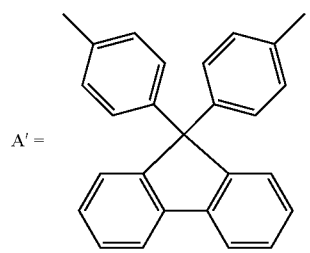

A′ =

Specifically, 9,9-bis(4-aminophenyl)fluorene (BF) (34.9 g, 100.0 mmol) and THF (300 mL) were put in a separable flask (Separable flask (1000 mL)) in a nitrogen atmosphere. After stirring with a mechanical stirrer at 0° C. for 10 minutes, triethylamine (30.8 mL, 220.0 mmol) was added, and then the mixture was stirred at 0° C. for 10 minutes. Thereafter, an acid chloride (57.2 g, 80.0 mmol) and adipoyl chloride (3.7 g, 20.0 mmol) were dissolved in THF (100 mL) and added dropwise, and reacted at 0° C. for 3 hours. After completion of the reaction, the product was reprecipitated and purified using water, and washed with water and methanol. The product was vacuum dried (80° C., 16 hours). White fibrous, yield: 88.0 g. FT-IR (ATR, cm$^{-1}$): 3290.0 (NH, amide), 2918.7, 2854.1, 1653.7 (C=O, carbonyl), 1601.6, 1533.1, 1497.5, 1461.8, 1409.7, 1222.6, 1174.4, 1014.4, 831.2, 727.0, 512.0.

<Example 3> (Synthesis of PA$_{50}$AC$_{50}$BF)

The synthesis scheme of PA$_{50}$AC$_{50}$BF, as a polyamide compound, is as shown in the above <Example 2> (synthesis of PA$_{80}$AC$_{20}$BF).

Except for 9,9-bis(4-aminophenyl)fluorene (BF) (34.9 g, 100.0 mmol) and THF (300 mL), triethylamine (30.8 mL, 220.0 mmol), an acid chloride (35.8 g, 50.0 mmol) and adipoyl chloride (10.2 g, 50.0 mmol), and THF (150 mL), synthesis was performed in the same manner as in the synthesis of PA$_{80}$AC$_{20}$BF. White fibrous, yield: 74.0 g. FT-IR (ATR, cm$^{-1}$): 3290.0 (NH, amide), 2918.7, 2854.1, 1653.7 (C=O, carbonyl), 1601.6, 1533.1, 1497.5, 1461.8, 1409.7, 1222.6, 1174.4, 1014.4, 831.2, 727.0, 512.0.

<Example 4> (Synthesis of PA$_{80}$TC$_{20}$BF)

A polyamide compound PA$_{80}$TC$_{20}$BF was synthesized according to the following scheme.

Scheme 3. Structure of high heat resistance bio-polyamide.

[Chemical Formula 24]

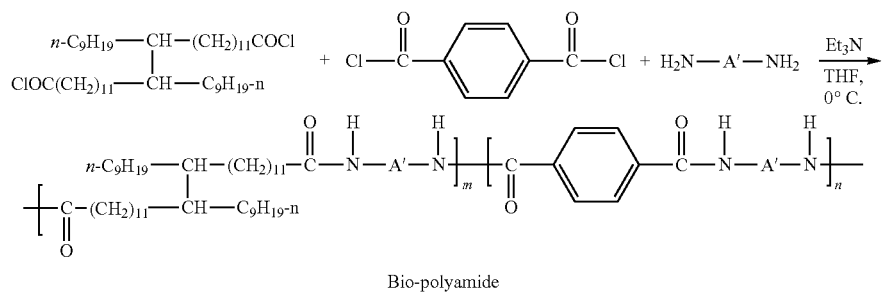

Bio-polyamide

[Chemical Formula 25]

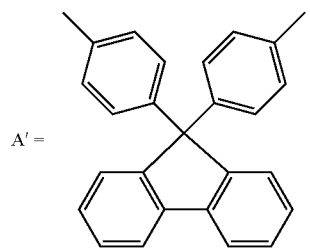

A' =

Except for 9,9-bis(4-aminophenyl)fluorene (BF) (34.9 g, 100.0 mmol) and THF (300 mL), triethylamine (30.8 mL, 220.0 mmol), an acid chloride (57.2 g, 80.0 mmol) and terephthaloyl chloride (4.1 g, 20.0 mmol), and THF (150 mL), synthesis was performed in the same manner as in the synthesis of $PA_{80}AC_{20}BF$. White fibrous, yield: 88.0 g. FT-IR (ATR, $cm^{-1}$): 3295.8 (NH, amide), 2921.6, 2851.2, 1659.4 (C=O, carbonyl), 1598.7, 1509.0, 1447.3, 1403.9, 1316.2, 1249.6, 1185.0, 817.7, 746.3, 627.7.

<Example 5> (Synthesis of $PA_{50}TC_{50}BF$)

The synthesis scheme of $PA_{50}TC_{50}BF$, as a polyamide compound, is as shown in the above <Example 4> (synthesis of $PA_{80}TC_{20}BF$).

Except for 9,9-bis(4-aminophenyl)fluorene (BF) (34.9 g, 100.0 mmol) and THF (300 mL), triethylamine (30.8 mL, 220.0 mmol), an acid chloride (35.8 g, 50.0 mmol) and terephthaloyl chloride (10.2 g, 50.0 mmol), and THF (150 mL), synthesis was performed in the same manner as in the synthesis of $PA_{80}AC_{20}BF$. White fibrous, yield: 70.0 g. FT-IR (ATR, $cm^{-1}$): 3296.7 (NH, amide), 2922.6, 2852.2, 1660.4 (C=O, carbonyl), 1605.4, 1597.7, 1509.0, 1446.4, 1403.9, 1316.2, 1249.6, 1185.0, 745.3, 633.5.

2. Evaluation of Mechanical Properties
2-1. Preparation of Test Piece

For the preparation of a test piece by injection molding, each polyamide compound was scale-up synthesized and collected samples (about 500 g) were used. Using Mini Test Press-10 manufactured by Toyo Seiki Seisaku-sho, Ltd., the collected samples were formed into a flat plate shape and cut into pellets. A test piece was prepared from the pellet using an injection molding machine (small electric injection molding machine SE18DUZ, manufactured by Sumitomo Heavy Industries, Ltd.). As molding conditions, the resin temperature was 140 to 200° C., and the mold temperature was 14 to 18° C. As the test piece, a JIS K 7162 (t2 mm) multipurpose test piece 5A type (dumbbell-shaped) and a width 10 mm×length 80 mm×thickness 4 mm test piece (strip-shaped) were molded. The dumbbell-shaped test piece was used for the tensile test. The strip-shaped test piece was processed into a K7110 type 1 test piece and used for Charpy impact test and bending test.

2-2. Tensile Test

For tensile properties, a tensile test was performed to evaluate the yield stress (tensile strength), the elastic modulus in tension, and the elongation at break. As the test piece, the JIS K 7162 multipurpose test piece 5A type (dumbbell-shaped) was used. In measurement, the width and thickness of the test piece were measured and employed. For the measurement, an AGI-50 kN type testing machine manufactured by Shimadzu Corporation was used. The measurement conditions were a tensile speed of 1 mm/min, a tensile load of 50 kN, and a measurement temperature of 23° C.

2-3. Bending Test

For the bending properties, a bending test was performed to evaluate the elastic modulus in bending and the bending strength. The test piece was evaluated according to K7171 for the K7110 type 1 test piece prepared in 2-1. In the test, the width and thickness of the test piece were measured. For the measurement, an AGS-X 10kNX5 testing machine manufactured by Shimadzu Corporation was used. The measurement conditions were a test speed of 2 mm/min, a maximum load of 10 kN, and a measurement temperature of 23° C.

2-4. Charpy Impact Test

The impact property was evaluated by performing a notched Charpy test to determine the Charpy impact value. The test piece was prepared by notching the K7110 type 1 test piece prepared in 2-1, according to K7111. In the test, the width and thickness of the test piece were measured. Charpy impact tester, DG-UB manufactured by Toyo Seiki Seisaku-sho, Ltd. was used for the measurement.

2-5. Results of Evaluation of Mechanical Properties

Tables 1 and 2 show the results of the evaluation of the mechanical properties of the polyamide compounds of the Examples.

TABLE 1

Mechanical properties of bio-based polyamide (PA/AC/BF).

| | | | | Biopolyamide | |
|---|---|---|---|---|---|
| Test items | | Unit | Test method | PA/BF | $PA_{80}AC_{20}BF$ |
| Tensile properties | Tensile strength | MPa | JIS K 7161-2 | 34.0 | 40.0 |
| | Tensile fracture strain | % | | 58.0 | 35.0 |
| Bending properties | Elastic modulus in bending | MPa | JIS K 7171 | 800.0 | 1050.0 |
| Impact property | Charpy impact strength | $kJ/m^2$ | JIS K 7111-1 | 96.0 | 18.0 |

TABLE 2

Mechanical properties of bio-based polyamide (PA/TC/BF).

| | | | | Biopolyamide | |
|---|---|---|---|---|---|
| Test items | | Unit | Test method | $PA_{80}TC_{20}BF$ | $PA_{50}TC_{50}BF$ |
| Tensile properties | Tensile strength | MPa | JIS K 7161-2 | 42.0 | 64.0 |
| | Tensile fracture strain | % | | 34.0 | 20.0 |
| Bending properties | Elastic modulus in bending | MPa | JIS K 7171 | 1040.0 | 1750.0 |
| Impact property | Charpy impact strength | $kJ/m^2$ | JIS K 7111-1 | 18.0 | 4.0 |

From the test results in Tables 1 and 2, it was confirmed that the polyamide compounds of the Examples were highly impact resistant, hard and tenacious resins.

3. Evaluation of Physical Properties 3-1. Measurement Method

The glass transition temperature (Tg) of the polyamide compound was determined by differential scanning calorimetry (DSC). The 5% weight loss temperature (Td) and thermal decomposition temperature of the polyamide compound were determined by simultaneous thermogravimetry/differential thermal analysis (TG/DTA). For the Tg measurement, evaluation was made according to JIS K7121. For the Td and thermal decomposition temperature measurement, evaluation was made according to JIS K7120.

For measurement, a thermal analyzer EXSTAR DSC7020 manufactured by Hitachi High-Tech Science Co., Ltd. and TG8120 manufactured by Rigaku Co., Ltd. were used, and the measurement conditions were as follows.

DSC measurement was made in a measurement temperature range: −50 to 280° C., at a heating rate: 10° C./min, and in a nitrogen stream (50 mL/min). TG/DT measurement was made at a measurement temperature: room temperature to 500° C., a heating rate: 10° C./min, and in a nitrogen stream (150 mL/min).

3-2. Measurement Results

Tables 3 to 5 indicate the measurement results.

TABLE 3

Physical Properties of bio-polyamide.

| | Biopolyamide | Glass transition temperature (Tg, ° C.) | 5% weight loss temperature (Td, ° C.) | Thermal decomposition temperature (° C.) |
|---|---|---|---|---|
| Example 1 | PA/BF | 65.0 | 416.0 | 449.0 |

TABLE 4

Physical Properties of bio-polyamide.

| | Biopolyamide | Glass transition temperature (Tg, ° C.) | 5% weight loss temperature (Td, ° C.) | Thermal decomposition temperature (° C.) |
|---|---|---|---|---|
| Example 2 | $PA_{80}AC_{20}BF$ | 79.0 | 421.0 | 452.0 |
| Example 3 | $PA_{50}AC_{50}BF$ | 102.0 | 410.0 | 447.0 |

TABLE 5

Physical Properties of bio-polyamide.

| Biopolyamide | | Glass transition temperature (Tg, °C.) | 5% weight loss temperature (Td, °C.) | Thermal decomposition temperature (°C.) |
|---|---|---|---|---|
| Example 4 | PA$_{80}$TC$_{20}$BF | 83.0 | 416.0 | 447.0 |
| Example 5 | PA$_{50}$TC$_{50}$BF | 118.0 | 420.0 | 448.0 |

From the measurement results in Tables 3 to 5, it was confirmed that the polyamide compounds of the Examples are resins having high thermal decomposition temperature and 5% weight loss temperature, and high heat resistance and heat stability.

4. Molecular Weight Evaluation of Polyamide Compound 4-1. Measurement Method

The molecular weight of a polyamide compound was determined by measurement by GPC (Gel Permeation Chromatography).

For measurement, a measuring device (HLC-82220GPC) manufactured by Tosoh Corporation (using an RI detector) was used, a column Shodex GPC KF-806L×3 manufactured by Showa Denko K.K. was used. The measurement conditions were as follows.

GPC measurement was made under the conditions: eluent: tetrahydrofuran (THF); standard substance: polystyrene (PS); sample concentration: 0.2 w/v %; injection volume: 100 μL; flow rate: 1.0 mL/min; and column temperature: 40° C.

4-2. Measurement Results

Table 6 indicates the measurement results.

TABLE 6

Molecular weight of bio-based polyamide.

| Biopolyamide | | Number average molecular weight Mn (×10$^4$) | Weight average molecular weight Mw (×10$^4$) | Degree of distribution Mw/Mn |
|---|---|---|---|---|
| Example 1 | PA/BF | 2.3 | 6.9 | 3.0 |
| Example 4 | PA$_{80}$TC$_{20}$BF | 2.1 | 5.9 | 2.8 |

5. Effect of Example

The polyamide compounds of the Examples are resins having excellent heat resistance and hard and tenacious properties. The polyamide compounds are resins in which a soft segment and a hard segment are linked by an amide bond, and which have a hydrophobic structure, a flexible alkyl chain, elongation properties and a rigid site, and further are transparent. The polyamide compounds of the Examples are characterized in that they have (1) high impact resistance, (2) a high thermal decomposition temperature, and (3) a high 5% weight loss temperature, and are (4) non-crystalline resins.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the scope of the appended claims, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, within the scope of the appended claims.

The present invention is not limited to the embodiments described in detail above, and can be modified or changed in various manners within the scope as set forth in the claims of the present invention.

The polyamide compound of the present invention can be used for a wide variety of applications as well as the applications to which conventional polyamide compounds have been applied. For example, it can be used as any members for an automobile, a railway vehicle, a ship, an airplane and so on. For example, it is used as an interior material and an exterior material. Among these, examples of automobile products include an automobile interior material, an automobile instrument panel, and an automobile exterior material. Specifically, there are listed: door base material, package tray, pillar garnish, switch base, quarter panel, side panel, armrest, automotive door trim, seat structure material, seat backboard, ceiling material, console box, automotive dashboard, various instrument panels, deck trim, bumper, spoiler, cowling and so on. Furthermore, for example, interior materials and exterior materials for buildings and furniture can be listed. That is, door covering materials, door structural materials, and covering materials for various types of furniture (desks, chairs, fences, chests, etc.) can be listed. Other examples include packages, containers (such as tray), protective members, and partition members.

What is claimed is:

1. A polyamide compound comprising:
    a dicarboxylic acid unit represented by the following general formula (1);
    a diamine unit represented by the following general formula (2); and
    a dicarboxylic acid unit represented by the following general formula (4),
    wherein
    a molar ratio of the dicarboxylic acid unit represented by the general formula (1): the dicarboxylic acid unit represented by the general formula (4) is 60:40 to 40:60,
    a number average molecular weight (Mn) of the polyamide compound is 10,000 to 50,000, and
    a content of diamine units other than the diamine unit represented by the following general formula (2) is less than 10% when a total of diamine units in the polyamide compound is taken as 100 mol %:

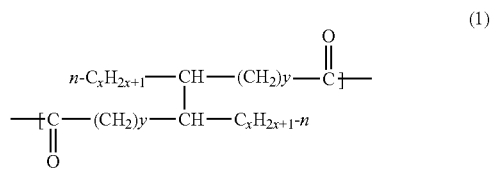

(1)

wherein x represents an integer from 6 to 12, and y represents an integer from 8 to 18;

(2)

-continued

A = 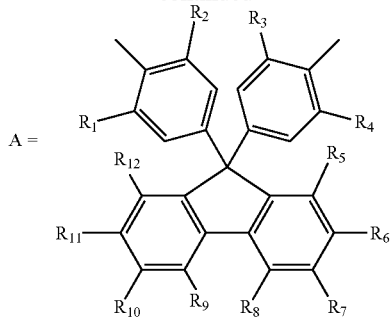

wherein $R_1$ to $R_{12}$ represent —H, an alkyl group represented by —$C_nH_{2n+1}$ (n=an integer of 1 to 4), an alkoxyl group represented by —$OC_nH_{2n+1}$ (n=an integer of 1 to 4), a carboxyl group, a carboxymethyl group, or halogen, which may be the same or different;

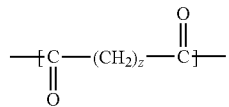 (3)

wherein p represents an integer of 1 to 5.

2. The polyamide compound according to claim 1, further comprising a dicarboxylic acid unit represented by the following general formula (3):

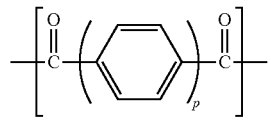 (4)

wherein z represents an integer of 2 to 18.

* * * * *